US012206182B2

(12) United States Patent
Frid

(10) Patent No.: US 12,206,182 B2
(45) Date of Patent: Jan. 21, 2025

(54) METHOD FOR OPERATING WIDE-BAND AESA

(71) Applicant: SAAB AB, Linköping (SE)

(72) Inventor: Henrik Frid, Järfälla (SE)

(73) Assignee: SAAB AB, Linkoping (SE)

( * ) Notice: Subject to any disclaimer, the term of this patent is extended or adjusted under 35 U.S.C. 154(b) by 0 days.

(21) Appl. No.: 18/691,092

(22) PCT Filed: Sep. 29, 2021

(86) PCT No.: PCT/SE2021/050960
§ 371 (c)(1),
(2) Date: Mar. 12, 2024

(87) PCT Pub. No.: WO2023/055262
PCT Pub. Date: Apr. 6, 2023

(65) Prior Publication Data

US 2024/0266755 A1 Aug. 8, 2024

(51) Int. Cl.
*H01Q 3/26* (2006.01)
*H01Q 3/28* (2006.01)
(Continued)

(52) U.S. Cl.
CPC ................. *H01Q 3/26* (2013.01); *H01Q 3/28* (2013.01); *H01Q 3/36* (2013.01); *H01Q 1/28* (2013.01); *H01Q 1/32* (2013.01); *H01Q 21/22* (2013.01)

(58) Field of Classification Search
CPC .. H01Q 3/28; H01Q 3/36; H01Q 3/26; H01Q 21/22; H01Q 1/28
(Continued)

(56) References Cited

U.S. PATENT DOCUMENTS 6,784,835 B2 * 8/2004 Kohno .................. H01Q 21/08 342/368
8,111,191 B2 * 2/2012 Falk .................... H01Q 3/2682 342/383
(Continued)

FOREIGN PATENT DOCUMENTS

CN 107766631 A * 3/2018 ........... G06F 17/142
CN 106650104 B 9/2019
(Continued)

OTHER PUBLICATIONS

International Search Reports and Written Opinion for Patent Cooperation Treaty Application No. PCT/SE2021/050960, dated Mar. 13, 2022, (13 pages).
(Continued)

*Primary Examiner* — Chuong P Nguyen
(74) *Attorney, Agent, or Firm* — Alston & Bird LLP

(57) ABSTRACT

A method for excitation of an array antenna across a specified bandwidth is disclosed. The specified bandwidth comprises M sample points, M being a positive integer >1, and the array antenna comprises N antenna elements, N being a positive integer ≥2. The method comprises forming a first matrix B(ω) defining an allowed frequency variation for an excitation coefficient for each antenna element, and forming a second matrix defining far field data for each antenna element at each sample point. Further the method comprises optimizing each excitation coefficient based on the formed first matrix and the formed second matrix, and controlling an excitation of the N antenna elements based on the optimized excitation coefficients. Hereby presenting a method for wideband optimization of the excitation coefficients for an array antenna.

11 Claims, 2 Drawing Sheets

(51) Int. Cl.
*H01Q 3/36* (2006.01)
*H01Q 1/28* (2006.01)
*H01Q 1/32* (2006.01)
*H01Q 21/22* (2006.01)

(58) Field of Classification Search
USPC .......................................... 342/371, 373, 379
See application file for complete search history.

(56) References Cited

U.S. PATENT DOCUMENTS

| | | | | |
|---|---|---|---|---|
| 11,217,889 | B2 * | 1/2022 | Ray | H04B 7/0617 |
| 11,422,176 | B2 * | 8/2022 | Qi | G01R 29/10 |
| 12,000,954 | B2 * | 6/2024 | Guo | H01Q 3/40 |
| 2012/0098702 | A1 * | 4/2012 | Falk | H01Q 21/00 342/372 |
| 2018/0115064 | A1 * | 4/2018 | Safavi-Naeini | H01Q 3/267 |
| 2019/0158198 | A1 * | 5/2019 | Qi | H04B 17/102 |
| 2021/0050667 | A1 * | 2/2021 | Ray | H04B 7/0617 |

FOREIGN PATENT DOCUMENTS

| | | | | |
|---|---|---|---|---|
| CN | 111291493 | A | 6/2020 | |
| GB | 2398428 | A | 8/2004 | |
| WO | WO-2018134877 | A1 * | 7/2018 | H04B 7/10 |
| WO | WO-2021094696 | A1 * | 5/2021 | H01Q 1/246 |

OTHER PUBLICATIONS

Karimkashi, Shaya et al., "Optimizing Radiation Patterns of a Cylindrical Polarimetric Phased-Array Radar for Multimissions", IEEE Transactions on Geoscience and Remote Sensing, vol. 53, No. 5, pp. 2810-2818, May 2015, doi: 10.1109/TGRS.2014.2365362.

* cited by examiner

METHOD FOR OPERATING WIDE-BAND AESA

CROSS REFERENCE TO RELATED APPLICATIONS

This application is a National Stage Application, filed under 35 U.S.C. § 371, of International Application No. PCT/SE2021/050960, filed Sep. 29, 2021, the contents of which as are hereby incorporated by reference in their entirety.

BACKGROUND

Related Field

The present invention relates to excitation of antenna elements, and more specifically to optimized excitation of wideband antenna arrays in order to reduce side-lobe levels.

Description of Related Art

An active electronically scanned array (AESA) is considered to be a phased array system having an array of antennas that form a beam of radio waves that can be electronically steered to point in different directions without physically moving the antenna. In the AESA, each antenna element is connected to a transmit/receive module (TRM). The TRMs enable for control of the phase and amplitude for each antenna element in both transmit (Tx) and receive (Rx) modes by means of e.g. a phase control unit and an amplifier unit. AESAs are generally associated with an optimization algorithm or optimization model for array antenna excitation in order to find the optimal phase and amplitude coefficients in order to achieve a specified far-field pattern. The primary use of AESA technology is in radar systems and communication systems, though AESAs also find place in electronic warfare (EW) systems because of its beam steering property.

An optimization aspect that is important from EW applications is low side-lobe levels. Firstly, low side-lobe levels reduces sensitivity to interference and ground or sea clutter outside the main lobe. Furthermore, a monopulse array requires a guard function that is used to determine if a specific signal was received in the side-lobes or in the main lobe. A lower side-lobe level will make the implementation of the guard function less challenging, and is therefore an additional reason for striving for low side-lobe levels.

Further, antenna arrangements for EW applications are associated with very large bandwidth demands. The demand for very large bandwidths in EW systems comes at least partly from the need to detect multiple emitters without knowing their operating frequencies. Electronic Support Measures (ESM) systems therefore typically use wideband AESAs to cover a number of radar frequency bands. There are numerous optimization techniques used for array antenna excitation to find the optimal phase and amplitude coefficients. However, the optimization algorithms for array antenna excitation are typically developed for single-frequency optimization. In other words, the computed phase and amplitude excitation coefficients will in general only be optimal at a single frequency, and suboptimal for the (entire) specified bandwidth. This issue is particularly problematic in EW applications due to the large bandwidth requirements.

There are at least two conventional methods for extending single frequency optimization to a specified bandwidth within the general field of antenna engineering. A first method is to apply the optimization at the center frequency. This will result in a reduced performance at the band edges. This is the common approach, and is sufficient for most narrowband systems, e.g. radar and communication systems. Due to the reduction of performance at the band edges, such methods are not suitable for EW AESAs. Another method is to apply single-frequency optimization at each frequency sample within the operational bandwidth. This typically results in rapidly varying excitation coefficients which cannot be implemented in AESAs due to the frequency dependence of the amplitude and phase control in the TRMs. Accordingly, the mentioned methods of extending the optimal excitation obtained with single-frequency methods to a specified bandwidth could therefore be difficult to realize in a practical system, and in particular for antenna arrangements to be used in EW systems.

There is accordingly a need for new and improved solutions for controlling an excitation of antenna elements in AESAs, and in particular there is a need for solutions which make it possible to realize AESAs which fulfil performance requirements over a sufficiently wide bandwidth for EW applications.

Both the above discussed methods for wideband beamforming presented do not take the frequency dependence inherent in the TRM into account. It is therefore, difficult to apply these wideband beamforming methods to AESAs. There exists a need in the prior art for optimizing the coefficients for the entire bandwidth especially for airborne EW AESAs.

There is accordingly a need for an improved EW AESAs that have high performance over very wide bandwidths. In more detail, there is a need for a solution to find an optimized excitation over a specified bandwidth rather than just a single frequency. Thus, a new and improved optimization algorithm is required that shall find the optimal excitation coefficients for a specified bandwidth rather than a single frequency. And at the same time the optimization algorithm should take the frequency dependence inherent in the TRMs into account, to make sure that the computed coefficients can be realized in an AESA.

BRIEF SUMMARY

It is therefore an object of the present disclosure to provide a method for excitation of an array antenna, a computer-readable storage medium, an antenna array, a vehicle comprising such an array, and an aircraft comprising such an array, which alleviates all or at least some of the above mentioned drawbacks of presently known solutions.

This object is achieved by means of a method for excitation of an array antenna, a computer-readable storage medium, an antenna array, a vehicle comprising such an array, and an aircraft comprising such an array as defined in the appended claims. The term exemplary is in the present context to be understood as serving as an instance, example or illustration.

According to a first aspect of the present disclosure, there is provided a method for excitation of an array antenna across a specified bandwidth. The specified bandwidth comprises M sample points, M being a positive integer >1, and the array antenna comprises N antenna elements, N being a positive integer ≥2. The method comprises forming a first matrix $B(\omega)$ defining an allowed frequency variation for an excitation coefficient for each antenna element, and forming a second matrix defining far field data for each antenna element at each sample point. Further the method comprises optimizing each excitation coefficient based on the formed first matrix and the formed second matrix, and controlling an excitation of the N antenna elements based on the optimized excitation coefficients. Hereby presenting a method for wideband optimization of the excitation coefficients for an array antenna.

The present inventor realized that in order to achieve wideband optimization of the excitation coefficients of the antenna elements in an array antenna one has to select a number of sample points or frequency points within the specified bandwidth of the antenna and optimize these points with a "trade-off". More specifically, the optimization step may include defining a cost function related to side-lobe levels, and reducing/minimizing these side-lobe levels. Generally speaking, by defining the optimization problem as a cost function, the solver will try to find the excitation coefficients that are associated with the lowest "total cost" with reference to the side-lobe levels.

Moreover, the present inventor realized that if one would use conventional single frequency optimization methods of a plurality of frequency points or sample points it would result in an infeasible equation which cannot be realized with TRMs. Instead, one must introduce a condition for the allowed frequency variation (i.e. the first matrix $B(\omega)$) in order to be able to impose conditions or restrictions in the optimization so that these frequency variations actually are accounted for. More specifically, the first matrix $B(\omega)$ may be understood as that since the array antenna employs TRMs, one can obtain the frequency dependence of the excitation coefficients. The frequency dependence may then be described by a mathematical model (typically an exponential function), or an interpolation function from measurement or simulation data. Stated differently, the first matrix $B(\omega)$ ensures that the excitation coefficients vary according to a predefined model (mathematically derived or interpolated).

Then, by using data describing the properties of the antenna elements, i.e. the far field data defined by the second matrix, an optimization problem or program can be formulated which may be solved numerically using an arbitrary numerical optimization solver.

According to a second aspect of the present disclosure, there is provided a (non-transitory) computer-readable storage medium storing one or more programs configured to be executed by one or more processors of an array antenna control system, the one or more programs comprising instructions for performing the method according to any one of the embodiments disclosed herein. With this aspect of the disclosure, similar advantages and preferred features are present as in the previously discussed first aspect of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

Further, in accordance with a third aspect of the present disclosure, there is provided an antenna array having an operating bandwidth. The antenna array comprises N antenna elements, N being a positive integer ≥2, and each antenna element is connected to a Transmit and Receive Module, TRM. The antenna array further comprises control circuitry connected to each TRM, where the control circuitry is configured to control each TRM so to apply an excitation coefficient for each antenna element, each excitation coefficient being optimized in accordance with the method according to any one of the embodiments disclosed herein. With this aspect of the disclosure, similar advantages and preferred features are present as in the previously discussed first aspect of the disclosure.

According to a fourth aspect, there is provided a vehicle comprising an antenna array according to any one of the embodiments disclosed herein. With this aspect of the disclosure, similar advantages and preferred features are present as in the previously discussed first aspect of the disclosure.

According to a fifth aspect, there is provided a vessel or ship comprising an antenna array according to any one of the embodiments disclosed herein. With this aspect of the disclosure, similar advantages and preferred features are present as in the previously discussed first aspect of the disclosure.

According to a sixth aspect, there is provided an aircraft comprising an antenna array according to any one of the embodiments disclosed herein. With this aspect of the disclosure, similar advantages and preferred features are present as in the previously discussed first aspect of the disclosure.

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

DETAILED DESCRIPTION OF VARIOUS EMBODIMENTS

Figure 1:
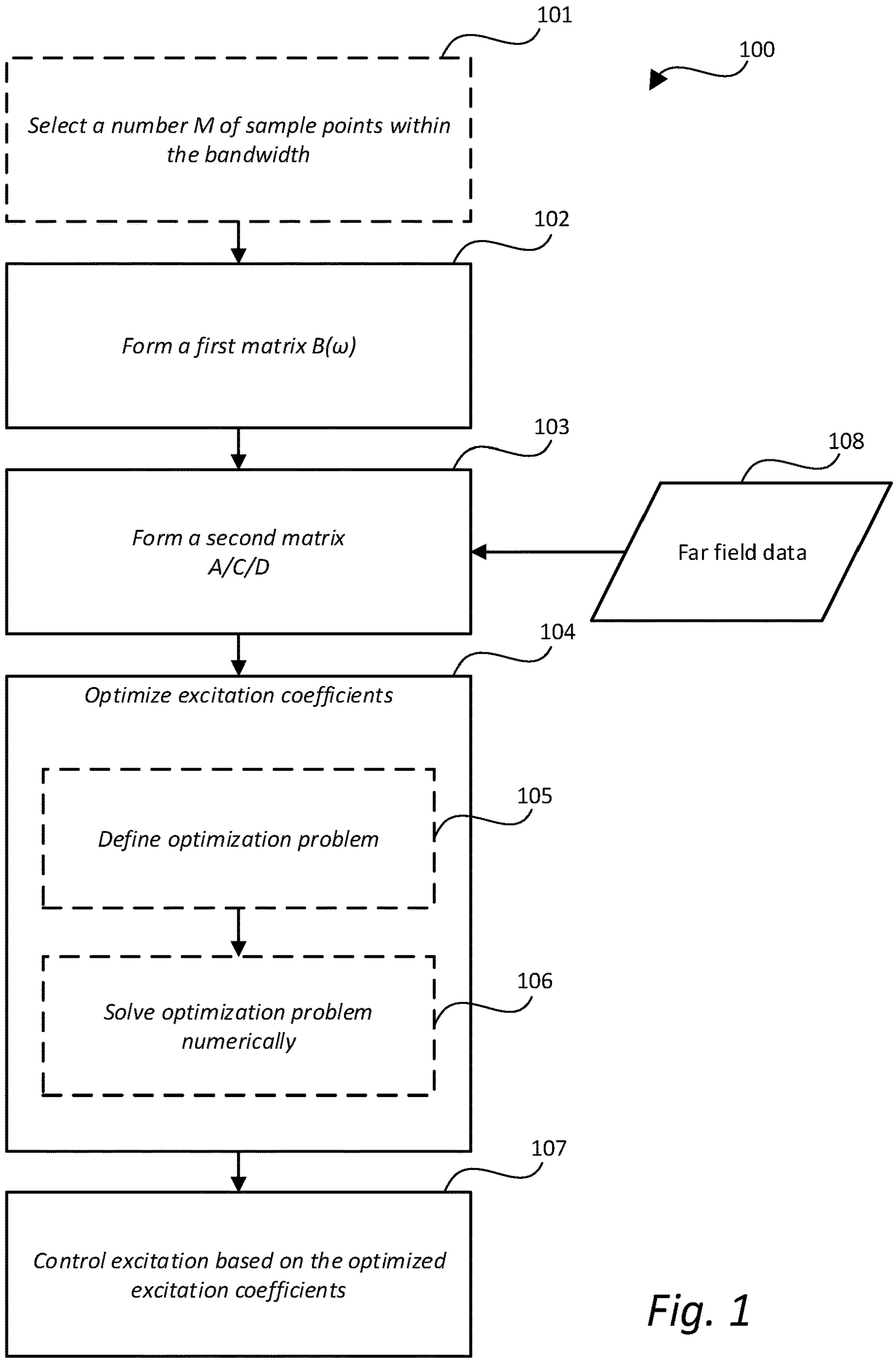
FIG. 1 is a schematic flow chart representation of a method for excitation of an array antenna in accordance with an embodiment of the present disclosure.

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

FIG. 1 is a schematic flow chart representation of a method 100 for excitation of an array antenna across a specified bandwidth. In more detail, the method 100 provides for an excitation of the antenna elements in an electronically scanned array antenna (may also be referred to as a phased array antenna) with optimized phase and amplitude coefficients in order to achieve a specified array far-field pattern. In the following disclosure, focus will be on achieving low side-lobe levels for a wideband sum pattern and a wideband difference pattern, however, the general principles are applicable in order to optimize the far-field pattern of the array antenna in terms of other aspects (e.g. wideband monopulse patterns with common excitation weights). Moreover, optimization algorithms for array antenna excitations are conventionally developed for single-frequency optimization. However, by means of the herein disclosed method 100 it is possible to derive the optimal excitation coefficients (amplitude and/or phase coefficients) for a specified bandwidth rather than a single frequency.

Moving on, the array antenna (e.g. AESA) has a specified operational bandwidth (e.g. 1-2 GHZ), and the specified bandwidth comprises M sample points, where M is a positive integer larger than one (M>1). The sample points may be equidistantly distributed across the specified bandwidth. For example, if M=101 and the specified bandwidth is 1-2 GHZ, then the sample points (may also be referred to as frequency points) may be 1.00 GHz; 1.01 GHz; 1.02 GHz; . . . 1.99 GHz; 2.00 GHz. However, as the skilled reader readily realizes, the sample points or frequency points do not need to be distributed equidistantly across the specified bandwidth but may in some embodiments be more concentrated about the center frequency of the specified bandwidth and more sparsely distributed at the edge frequencies of the specified bandwidth. The method 100 may accordingly comprise an optional step of selecting 101 a number M of sample points within the specified bandwidth, where M is a positive integer larger than one. Preferably M is a positive integer larger than ten, and more preferably a positive integer larger than fifty, such as e.g. larger than one hundred.

Further, the method comprises forming 102 a first matrix B(ω). The first matrix B(ω) defines an allowed frequency variation for one or more excitation coefficients (amplitude and/or phase) associated with each antenna element of the array antenna. The first matrix B(ω) may be a diagonal N×N matrix, where the diagonal elements may be described by a mathematical model (typically an exponential function), or described by an interpolation function obtained from measurement data or simulation data.

Thus, in some embodiments, the first matrix B(ω) is a diagonal N×N matrix defined by:

$$B_{nn}(\omega) = e^{-j(\omega-\omega_c)\tau_n} \quad \text{(E1)}$$

where ω is an angular frequency, $\omega_c$ is a reference frequency (arbitrarily chosen), $\tau_n$ is a time delay for antenna element n. The computation or formation 102 of the first matrix B(ω) may vary depending on design choices of the antenna array. More specifically, the first matrix B(ω) may be formed based on how the transmit/receive modules (TRMs) are implemented in the array antenna. For example, the allowed frequency variation of the one or more excitation coefficients may depend on if the TRMs are implemented with variable gain amplifiers (VGAs), true time delays (TTDs), and phase shifters; with only VGAs and TTDs; or with only VGAs and phase shifters. The VGAs may be replaced by tuneable attenuators in some embodiments.

A more detailed discussion related to the computation/formation 102 of the first matrix B(ω) and the background reasoning thereof is given further down the description in reference to a specific realization. However, in more general terms, the formation of the first matrix B(ω) is at least partly based on the insight that, since TRMs are employed in the array antenna, and the properties of the TRMs are known, the frequency dependence of the excitation coefficients are known and readily definable by the first matrix B(ω). Moreover, by having the frequency dependence defined by the first matrix B(ω), one is then provided with a good estimation of the frequency variations of the whole array antenna system, wherefore it is possible to impose requirements on an optimization algorithm/model to account for these frequency variations. In summary, this provides for a means to optimize the excitations of an array antenna across a wide bandwidth rather than a single frequency.

Further, the method 100 comprises forming 103 a second matrix (referred to as matrix A, C, or D further down the description). The second matrix defines far field data 108 for each antenna element at each sample point. The far field data 108 may comprise measured data, simulated data, or be based on a predefined equation. Thus, if the first matrix B(ω) is understood as describing the allowed frequency variation for each antenna element, then the second matrix describes some of the electromagnetic properties of each antenna element. In some embodiments, the far field data is Embedded Element Pattern (EEP) data 108 of each antenna element in the array antenna. An embedded element pattern may be understood as the radiation pattern of a phased array when one antenna element is excited and all other antenna elements are terminated in a specified impedance.

An advantage of using EEPs is that the effects of mutual coupling can be taken into account in the optimization. This advantage is particularly clear for aperiodic arrays and small array antennas. For an array antenna comprising N antenna elements, the EEPs can be determined from N simulations or measurements, where one antenna element is excited at a time while the remaining antenna elements are terminated in matched loads. Moreover, by including the installation configuration in these simulations or measurements, the installed embedded element patterns (IEEPs) are obtainable. Thus, in some embodiments the far field data is IEEP data 108. Moreover, depending on the level of detail, the IEEPs may capture effects of a radome as well as reflections in metallic structures on the platform. By using IEEPs, it is possible to compensate for the phase shift and reflections in a radome, thereby compensating for the increased side-lobe level often seen when installing the radome.

Further, the method 100 comprises optimizing 104 each excitation coefficient based on the formed first matrix and the formed second matrix. In some embodiments, the step of optimizing each excitation coefficient comprises defining 105 an optimization problem based on the first matrix B(ω) and the second matrix, and solving 106 the defined optimization problem using a numerical optimization solver. Stated differently, the method 100 may comprise using the formed 102 first matrix B(ω) and the formed 103 second matrix in order to formulate/define 105 an optimization program which is subsequently solved 106 by a numerical "solver". The optimization program/problem may for example be formulated as a convex optimization program/problem.

Figure 2:
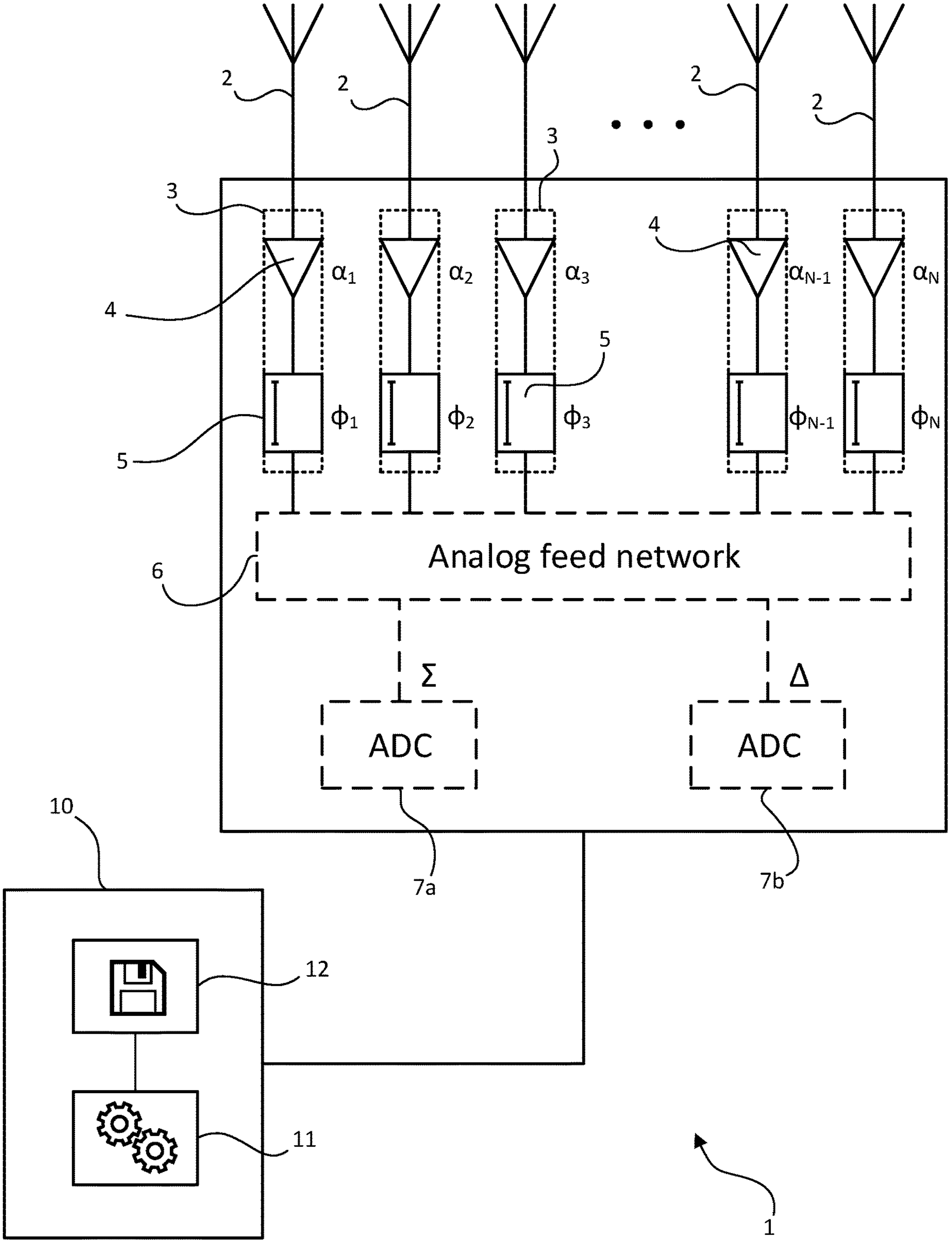
FIG. 2 is a schematic block diagram representation of an antenna array comprising control circuitry in accordance with an embodiment of the present disclosure.

FIG. 2 is a schematic block diagram illustrating an antenna array 1, in the form of an active electronically scanned array (AESA) 1, with N antenna elements 2 in a receiving (Rx) mode. Each antenna element 2 has a frequency-dependent gain coefficient $\alpha_n(\omega)$, and a frequency-dependent phase coefficient $\phi_n(\omega)$, where n=1, 2 . . . N−1, N. Moreover, each antenna element 2 is connected to a transmit/receive module (TRM) 3. The TRMs enable control of the phase and amplitude of the emitted signal for each antenna element, in both transmit (Tx) mode (not shown) and receive (Rx) mode. The TRM may typically include switches configured to switch between the Tx and Rx modes. The phase coefficients may be applied using phase control units 5, e.g. in the form of phase shifters, true time delays (TTD) or a combination of both. The gain coefficients may be provided by an amplifier unit 4.

Furthermore, a feed network 6 forms the sum and differences of the signals from the array. In the illustrated example, the corresponding two channels, i.e. one for the sum signal Σ and one for the difference signal Δ are received by two analog to digital converters (ADCs). However, it is possible to have more than two channels.

The antenna array 1 further has a control device 10 connected to each TRM 4. The control device has control circuitry 11 (may also be referred to as one or more processors 11) and a memory unit 12. The control circuitry 11 is configured to control each TRM so to apply an excitation coefficient (phase and/or amplitude coefficient) for each antenna element, each excitation coefficient being optimized in accordance with the method according to any one of the embodiments disclosed herein. The antenna array may be provided/mounted on a surface vehicle (land-based), a vessel/ship (naval), or an aircraft (airborne) (not shown).

The processor(s) 11 (associated with the control device 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

In the following, the focus will be optimizing the antenna elements 2 of an AESA 1 in the receiving mode, and more particularly to a monopulse configuration in the receive (Rx) mode. Due to the reciprocity of the array pattern, the resulting optimization program/problem is analogously applicable for the transmit (Tx) mode. As mentioned, the phase control unit 5 may be realized using phase shifters and/or TTDs. Ideally, phase shifters produce a phase shift which is independent of frequency within the specified bandwidth, while TTDs produce a phase shift which is proportional to the frequency. Similarly, the amplifiers 3 may be in the form of variable gain amplifiers (VGAs) which can be designed for a gain which is ideally independent of frequency within the specified bandwidth, or to vary linearly with a specified gain slope. However, the present inventor realized that in order for the optimal excitation to be realizable in a wideband AESA, there is therefore a need to introduce constraints which make each frequency sample dependent on the adjacent frequency sample. This may herein be referred to as wideband array optimization, as opposed to the single-frequency optimization described in the background section of the present disclosure.

In the following three examples cases for which the principles of the present disclosure may be applied are discussed. The three example cases relate to three TRM 3 implementations, in the following referred to as Case A, Case B, and Case C. Case A assumes that a combination of phase shifters and TTDs are used in each TRM 3. Case B assumes that only TTDs but not phase shifters are used, whereas case C assumes that phase shifters but not TTDs are used.

Array Pattern as a Sum of Embedded Element Patterns

As mentioned in the foregoing, the second matrix defining far field data for each antenna element at each sample point may be in the form of a matrix comprising EEP or IEEP data. The EEP for antenna element n may be denoted by $\vec{f}_n(\hat{r},\omega)=\hat{n}^{(co)}f_n(\hat{r},\omega)+\hat{n}^{(cr)}f_n^{(cr)}(\hat{r},\omega)$ where $f_n(\hat{r},\omega)$ is the co-polarization component at the angular frequency ω. One may use Ludwig's $3^{rd}$ definition for $\hat{n}^{(co)}$ and $\hat{n}^{(cr)}$ in some implementations. The relation between the electric far-field $\vec{E}_n(\hat{r})$ and the corresponding EEP is:

$$\vec{E}_n(\hat{r},\omega)=\frac{e^{-jkr}}{r}V_n\vec{f}_n(\hat{r},\omega), \tag{1}$$

where k=ω/c is the free-space wavenumber. Moreover, one can choose the following normalization coefficients $$V_n=\sqrt{\frac{\eta P_n}{2\pi}}, \tag{2}$$

where $P_n$ is the stimulated power used in the simulation or measurement for element n, and η is the free-space impedance. The co-polarization component of the array far-field evaluated in the unit direction $\hat{r}$ is given by $$F(\hat{r},\omega)=\sum_{n=1}^{N}a_n(\omega)f_n(\hat{r},\omega)=f(\hat{r},\omega)^Ta(\omega). \tag{3}$$

The cross-polarization component is calculated by analogy, by replacing $f_n(\hat{r},\omega)$ with $f_n^{(cr)}(\hat{r},\omega)$ in equation (3). With the notation on the right-hand side of equation (3), the N excitation coefficients are organized in a frequency-dependent column vector $a(\omega)$. The following notation may be used $$a_n(\omega) = \alpha_n(\omega)e^{j\phi_n(\omega)}, \tag{4}$$

where $\alpha_n$ and $\phi_n$ are frequency-dependent real-valued amplitude and phase coefficients. Note that all EEPs/IEEPs are evaluated in the same system of coordinates. Equation (3) may be presented with different phase reference points for each element, whereby an additional exponential factor appears in equation (3). With the EEPs/IEEPs $\vec{f}_n(\hat{r},\omega)$ evaluated in the phase reference point $\vec{r}_n$ of element n, the relation is given by $\vec{f}_n(\hat{r},\omega)=\vec{f}_n'(\hat{r},\omega)e^{jk\hat{r}\cdot\vec{r}_n\cdot r}$.

Using the normalization from equation (2), the realized gain is given by $$G_r(\hat{r}, \omega) = \frac{|\vec{f}_n(\hat{r}, \omega)|^2}{\|a(\omega)\|_2^2}, \tag{5}$$

where the norm is defined as $$\|a(\omega)\|_2^2 = \sum_{n=1}^{N} |a_n(\omega)|^2. \tag{6}$$

The directivity and gain are obtained by analogy by replacing $P_n$ by the radiated or accepted powers respectively. The partial realized gain is then obtained by only including the co-polarization component in equation (5).

Constraints on Phase Coefficients $\phi_n$

The maximum of the array factor is steered to $\hat{r}_0$, when the frequency-dependent phase shifts $$\phi_n(\omega) = -\tau_n\omega \tag{7}$$

are applied, where $\omega=2\pi f$ is the angular frequency and $\tau_n$ are the time delays given by $$\tau_n = \vec{r}_n \cdot \frac{\hat{r}_0}{c}. \tag{8}$$

A beam squint effect occurs if the frequency dependence does not correspond to equation (7), which is the case for regular phase shifters, even in the ideal case. Wideband AESAs are therefore preferably constructed with TTDs, which ideally satisfy equation (7). Thus, in accordance with some embodiments each phase control unit 5 is realized by means of a TTD. Further, a phase shifting device (i.e. a phase control unit 5) can be designed to generate to generate a phase shift according to $$\phi_n(\omega) = -\tau_n(\omega - \omega_c) + \phi_n^{(c)} \tag{9}$$

where $\omega_c$ is an arbitrarily chosen frequency reference point within the bandwidth. In equation (9), the frequency-dependent term is generated by a TTD, while frequency independent term $\phi_n^{(c)}+\tau_n\omega_c$ is generated by a phase shifter. The phase is thus described by the two parameters $\tau_n$ and $\phi_n^{(c)}$ for each antenna element 2.

Depending on implementation with equation (9), the following optimization cases may be of interest. The first case is the most general, with $\phi_n$ and $\phi_n$ to be determined from optimization. This corresponds to TRMs implemented with a combination of TTDs and phase shifters. This optimization problem is however not convex since (3) is not a convex function of $\tau_n$. In the following, focus will be put on convex optimization, and the non-convex case will therefore not be discussed in any explicit detail. However, the implementation of the non-convex optimization problem/program will be briefly summarized in the end.

The above mentioned three cases however, Case A, Case B, and Case C, can be solved by convex optimization.

For Case A: By taking advantage of equation (8), $\tau_n$ can be considered to be known, while on $\phi_n^{(c)}$ is determined from optimization. This formulation should result in the correct scan direction and eliminate beam squint. As stated in the foregoing, the corresponding TRMs 3, or more specifically the phase control units 5, are implemented by a combination of TTDs and phase shifters.

For Case B: The optimization problem with $\tau_n$ determined using equation (8) and $\phi_n^{(c)}=\omega_c=0$ is a convex problem which corresponds to TRMs 3, or more specifically the phase control units 5, being implemented with TTDs, but with no phase shifters, i.e. a very common hardware implementation for wideband AESAs. Since the phase is assumed to be known in this case, this optimization problem is used only to determine optimal amplitude tapering.

For Case C: The optimization problem with $\tau_n=0$ and $\phi_n^{(c)}$ to be determined from optimization is a convex problem which corresponds to TRMs 3, or more specifically the phase control units 5, being implemented with phase shifters, but no TTDs, i.e. a very common hardware implementation for narrowband AESAs.

Constraints on Amplitude Coefficients $\alpha_n$

The amplitude coefficients $\alpha_n$ may be realized using VGAs 4. In the same way that a rapidly fluctuating phase is difficult to realize using phase shifters or TTDs, it is difficult to realize an amplification which is varying rapidly with frequency. A commonly used relation between gain and frequency for an amplifier within a specified is (in decibel scale):

$$\alpha_n^{(aB)}(w) = G_{n,cencer} + \kappa(\omega - \omega_c), \tag{10}$$

where $G_{n,center}$ is the gain at center frequency for a $(VGA)_n$, and $\kappa$ is the gain slope coefficient. By introducing the notation $G_{n,center}=20\log_{10}\beta_n$ and $\kappa=20$ s this is conveniently expressed in linear scale as $$\alpha_n(\omega) = \beta_n 10^{s(\omega-\omega_c)}. \tag{11}$$

The gain slop coefficient $\kappa$ can be either positive or negative depending on the AESA system specification. As an example, a positive gain slope can be used to compensate for losses in long RF cables which have a negative gain slope, thereby resulting in a flat frequency gain on a system level.

The same gain slope coefficient is applied to all TRMs 3, since allowing individual variations may significantly increase the complexity and cost. Hence, $$\|\alpha_n(\omega)\|_2^2 = 10^{2s(\omega-\omega_c)}\|\beta_n\|_2^2. \quad (12)$$

By using the normalization $\|\beta_n\|_2^2=1$ with equation (2), and inserting (12) into (5) the following is obtained $$G_r(\hat{r}, \omega) = \left|\sum_{n=1}^{N} \beta_n e^{j\phi_n(\omega)} \vec{f}_n(\hat{r}, \omega)\right|^2. \quad (13)$$

Note that the realized gain (13) is independent of the gain slope coefficient κ. The gain slope coefficient is therefore arbitrary and can be specified based on other considerations rather than being determined by the optimization. In other words, by this additional degree of freedom provided by the independence of the realized gain (13) from the gain slope coefficient improvements on a system level are readily achievable. By comparing equation (13) to equation (3), it is noted that the realized gain can be evaluated as $|\vec{F}(\hat{r},\omega)|^2$ with $$\alpha_n(\omega) = \beta_n, \quad (14)$$

i.e. an amplitude excitation which is constant in frequency. As demonstrated in the foregoing, equation (14) is applicable for calculating the realized gain for an arbitrary gain slope under the assumption that the same gain slope is used for all antenna elements.

Wideband Optimization

The optimization program/problem is derived by considering the excitation coefficients an as unknown at the reference frequency $\omega_c$, and extending the frequency-dependent to the specified bandwidth using equations (4) with (9) and (14). An exemplary embodiment comprising an optimization program configured to optimize the realized gain is presented in the following. An advantage in optimizing the realized gain rather than the directivity is that the mismatch is taken into account in the optimization. This will result in a trade-off where total active reflection (TARC) is taken into account in the optimization implicitly through the realized gain.

First, the (specified) bandwidth of the array antenna 1 is sampled at M sample points (frequency points). The EEP data for each antenna element 2 is obtained from measurements or simulations at these sample points. Then, by using equation (4) with (9) and (14) the array far-fields can be evaluated at all of the M frequency samples, with only N complex-valued $a_n(\omega_c)$ to be determined from optimization. The extension from $\omega_c$ to the remaining frequency samples can then be expressed as a matrix multiplication $$a_n(\omega) = B(\omega)a_n(\omega_c), \quad (15)$$

where B(ω) (first matrix) is a diagonal N×N matrix defined by $$B_{nn}(\omega) = e^{-j(\omega-\omega_c)\tau_n}. \quad (16)$$

Equations (16) and (E1) defining the same relationship.

Cases A, B, and C are all implemented with equation (16). For Case A, $\tau_n$ in (16) is determined by (8). For Case C, the first matrix B(ω) is an identity matrix since $\tau_n=0$. Case B is implemented with $\omega_c=0$.

Optimal Sum Pattern with Low Side-Lobe Levels, Cases a and C

In some embodiments, the goal of the optimization method presented in the following is to minimize the side-lobe level in predefined side-lobe regions. Therefore, the far-field amplitude is sampled at sample points $\hat{r}_i$, i=1, 2, . . . , Q, in the side-lobe regions Ω, by using the summation in equation (3), i.e.

$$F(\hat{r}_i, \omega) = f(\hat{r}_i, \omega)^T B(\omega)a(\omega_c). \quad (17)$$

The sampled co-polarized side-lobe level costs are collected in a vector of length Q:

$$s(\omega) = A(\omega)B(\omega)a(\omega_c), \quad (18)$$

where A (second matrix) is a Q×N complex-valued matrix according to:

$$A(\omega) = \begin{pmatrix} p_1(\omega)f(\hat{r}_1, \omega)^T \\ p_2(\omega)f(\hat{r}_2, \omega)^T \\ \vdots \\ p_Q(\omega)f(\hat{r}_Q, \omega)^T \end{pmatrix}. \quad (19)$$

The cross-polarization side-lobe samples are evaluated by analogy by replacing $f(\hat{r}_i, \omega)$ by $f^{(cr)}(\hat{r}_i,\omega)$ in (19). The coefficients $p_1, p_2, \ldots, p_Q$ are penalty coefficients used to apply varying side-lobe penalties at various regions.

A condition may be needed to reject the trivial solution a=0, which would result in a zero side-lobe level cost. This can be implemented as $$f(\hat{r}_0, \omega_c)^T a(\omega_c) = 1, \quad (20)$$

which corresponds to unity amplitude and zero phase in the scan direction. In addition to rejecting the trivial solution, equation (20) can be considered to be a normalization of the vector $a(\omega_c)$ to set the renormalized realized gain in the scan direction to 0 dB at the center frequency. Note that the normalization $\|\alpha_n(\omega)\|_2^2=1$ used for the realized gain above is a quadratic form, i.e. a non-convex constraint. It is therefore practical to use equation (20) during the optimization, and thereafter renormalize a(ω) to plot the realized gain. Another advantage with the normalization (20) is that $|f(\hat{r}_i,\omega)^T a(\omega_c)|^2$ can be interpreted as that the side-lobe level for a side-lobe level point $\hat{r}_i$, when $\omega=\omega_c$. For $\omega\neq\omega_c$ the situation is slightly different since the sum-pattern gain varies with frequency. One example method to take this into account is to consider that the gain scales as $G=4\pi\epsilon_{eff}\gamma/\lambda^2 \propto \omega^2$, where γ is the aperture area and $\epsilon_{eff}$ is the aperture efficiency. Accordingly, in some embodiments the following penalty coefficients are used in an implementation:

$$p_i(\omega) = \frac{\omega_c}{\omega}. \tag{21}$$

It is possible to modify equation (21) in order to obtain a higher side-lobe penalty at the corresponding sample point $\hat{r}_i$, or stricter side-lobe constraints are certain frequencies.

In a subsequent step, the Q side-lobe samples at the at the M frequencies (sample points) are collected in a matrix of dimensions (QM)×2:

$$E = \left(Ca(\omega_c),\ C^{(cr)}a(\omega_c)\right), \tag{22}$$

where the first column of E contains the co-polarized side-lobe level costs and the second column contains the cross-polarized side-lobe level costs. The matrices C and $C^{(cr)}$ are of dimension (QM)×N:

$$C = \begin{pmatrix} A(\omega_1)B(\omega_1) \\ A(\omega_2)B(\omega_2) \\ \vdots \\ A(\omega_M)B(\omega_M) \end{pmatrix}, \tag{23}$$

and $C^{(cr)}$ is defined by analogy. The side-lobe level cost for each sample can therefore be evaluated as the norm of the corresponding row in matrix E.

Accordingly, the following convex optimization problem is obtained:

$$\min_{a(\omega_c)\in\mathbb{C}^N} \max \left\| Ca(\omega_c),\ C^{(cr)}a(\omega_c) \right\|_2 \tag{24}$$

$$\text{subject to}$$

$$f(\hat{r}_0, \omega_c)^T a(\omega_c) = 1.$$

The norm operation $\|\bullet\|_2$ in (24) is applied to each row in the matrix E, and $\mathbb{C}^N$ is the set of complex-valued vectors of length N. With this formulation, the optimization problem can be directly implemented in a convex optimization tool such as CVX (Matlab-based modeling system). This optimization problem is used to compute the N unknowns $a(\omega_c)$ which are optimal for the specified bandwidth.

In summary, the optimization method uses the following input: Firstly, the far-field data (e.g. EEPs) for the N antenna elements sampled at M frequencies in the bandwidth (i.e. the second matrix). Furthermore, the first matrix B(ω) is required. The computation of the first matrix B(ω) may further be based on the antenna locations $\vec{r}_n$. A scan direction $\hat{r}_0$ and side-lobe regions Ω may also be specified. Moreover, it is possible to control the shape of the beam to make the beam more narrow or wide depending on the specified side-lobe regions.

Optimal Sum Pattern with Low Side-Lobes, Case B

Some modification is needed for the optimization program from equation (24) for Case B where only the amplitude coefficients are determined from optimization. This program can be implemented as an optimization over the set of real-valued non-negative coefficients β. For Case B, $\omega_c$=0 and equation (8) are specified in equation (16). Consider the constraint from equation (20), which is used to reject the trivial solution. With $\phi_n^{(c)}=0$, equation (20) is reformulated as $f(\hat{r}_0,\omega_c)^T B(\omega_c)\beta=1$. This constraint specifies the imaginary part to be zero, which cannot be satisfied in general with non-negative real-valued coefficients β. An alternative constraint is therefore used to reject the trivial solution:

$$\min \beta \geq \gamma. \tag{25}$$

The parameter γ>0 controls the normalization, which can be considered arbitrary since the results will be renormalized to present realized gain. This constraint also differs from (20) in the sense that it prohibits setting any excitation coefficients equal to zero. This is not considered to be a restriction, since setting some coefficients equal to zero would result in a reduced aperture efficiency.

In conclusion, for Case B we have the following optimization problem:

$$\min_{\beta\in\mathbb{R}^{+N}} \max \left\| C\beta,\ C^{(cr)}\beta \right\|_2 \tag{26}$$

$$\text{subject to}$$

$$-\min \beta \leq -\gamma$$

where $\mathbb{R}^{+N}$ is the set of positive real numbers in vectors of length N.

Optimal Difference Patterns

The monopulse method is a radar or an Electronic Support Measure (ESM) method that uses processing of a radio signal to provide accurate directional information. The name refers to its ability to extract direction from a single signal pulse. In other words, the monopulse method is a direction finding (DF) technique. The monopulse method relies on three simultaneous signals to estimate the direction of arrival (DoA): The sum signal, the azimuth difference signal, and the elevation difference signal. The DoA is often estimated from the ratios of difference and sum signals by an estimation algorithm. These three signals are received by the monopulse array in the corresponding sum and difference radiation patterns. The following short hand notation will be used Σ, Δa, and Δe to denote the sum signal, the azimuth difference signal, and the elevation difference signal respectively. There are multiple array configurations used for obtaining simultaneous sum and difference patterns. One commonly used sub-array configuration is the four-quadrant monopulse array. In the following, a convex optimization program for optimal difference patterns with low side-lobes will be presented. A conventional design of analog feed networks 6 for the four quadrant monopulse array results in the common excitation weight vector a(ω) being used for all three patterns Σ, Δa, and Δe. The trade-off needed to obtain small side-lobes in all three patterns when sharing common excitation weights will be discussed after the optimal difference patterns with low side-lobes.

Moving on, while sum patterns are computed using equation (3), difference patterns are computed by $$F_\Delta(\hat{r}, \omega) = f(\hat{r}, \omega)^T S a(\omega), \tag{27}$$

where S is a diagonal matrix. The diagonal elements of S are either +1 or −1, depending on which sub-array the corresponding array element 2 belongs to. For a four-quadrant configuration we use $S_a$ to denote the matrix used for computing the azimuth difference pattern $F_{\Delta a}$, and $S_e$ to denote the matrix used for computing the elevation difference pattern $F_{\Delta a}$. The method presented herein is not restricted to a four-quadrant configuration, since any sub-array configuration can be considered simply by modifying S. The cross-polarization component is computed by analogy by replacing $f(\hat{r},\omega)$ with $f^{(cr)}(\hat{r},\omega)$ in equation (27).

One of the properties of DoA estimation with the monopulse method is that the direction to the target is approximately proportional to the target's displacement from the scan direction $\hat{r}_0$. Therefore, the difference signal is ideally zero when the target is located at $\hat{r}_0$. To prevent the zero in the difference pattern to drift from $\hat{r}_o$ as a result of the chosen excitation, we use the following convex constraint, $$|f(\hat{r}_0, \omega)^T S a(\omega)| \le \delta, \tag{28}$$

where δ is a small tolerance number.

Similarly to the optimization of sum patterns described in the foregoing, the difference patterns may also be sampled in both polarizations in pre-defined side-lobe regions by means of equation (27). In conclusion, optimal difference patterns for Cases A and C may be computed using the following optimization program:

$$\min_{a(\omega_c)\in\mathbb{C}^N} \max\left\|C_\Delta a(\omega_c),\ C_\Delta^{(cr)} a(\omega_c)\right\|_2 \tag{29}$$

$$\text{subject to}$$

$$f(\hat{r}_0, \omega)^T a(\omega_c) = 1,$$

$$|f(\hat{r}_0, \omega_m)^T S a(\omega_m)| \le \delta \quad m = 1, 2, \ldots, M,$$

where $C_\Delta$ is calculated according to (23) with the inclusion of the matrix S (i.e. $S_a$ or $S_e$). The modification of equation (29) for case B follows from the above disclosure related to equations (25) and (26). This modification will however be exemplified in the following for the case with common excitation weights.

Monopulse Patterns with Common Excitation Weights

At each frequency sample, there are three specified side-lobe regions: $\Omega_\Sigma$, $\Omega_{\Delta a}$, and $\Omega_{\Delta e}$ for the sum pattern and the azimuth and elevation difference patterns, respectively. Six matrices, i.e. C, $C^{(cr)}$, $C_{\Delta e}$, $C_{\Delta e}^{(cr)}$, $C_{\Delta a}$, and $C_{\Delta a}^{(cr)}$, are calculated according to equation (23) with the inclusion of the matrices $S_e$ and $S_a$ in the evaluation of the difference patterns. As an example, $C_{\Delta e}$ is calculated by means of equation (23) with $A(\omega)$ replaced by $A_{\Delta e}(\omega)S_e$, where $A_{\Delta e}$ is sampled in $\Omega_{\Delta e}$. We define matrix D as $$D = \begin{pmatrix} C \\ l_e C_{\Delta e} \\ l_a C_{\Delta a} \end{pmatrix}, \tag{30}$$

with $D^{(cr)}$ calculated by analogy. The parameters $l_e$ and $l_a$ are penalty coefficients, which can be used e.g. to allow a larger side-lobe level in the difference patterns compared to the sum pattern. In conclusion we have the following optimization program for Cases A and C:

$$\min_{a(\omega_c)\in\mathbb{C}^N} \max\left\|D a(\omega_c),\ D^{(cr)} a(\omega_c)\right\|_2 \tag{31}$$

$$\text{subject to}$$

$$f(\hat{r}_0, \omega)^T a(\omega_c) = 1,$$

$$|f(\hat{r}_0, \omega_m)^T S_a B(\omega_m) a(\omega_c)| \le \delta \quad m = 1, 2, \ldots, M$$

$$|f(\hat{r}_0, \omega_m)^T S_e B(\omega_m) a(\omega_c)| \le \delta \quad m = 1, 2, \ldots, M$$

Compared to the optimization problem defined by equation (24), this optimization problem contains 2M additional constraints, in addition to side-lobe samples also in the difference patterns.

For Case B, the optimization problem defined by (31) can be modified according to:

$$\min_{\beta\in\mathbb{R}^{+N}} \max\left\|D\beta,\ D^{(cr)}\beta\right\|_2 \tag{32}$$

$$\text{subject to}$$

$$-\min \beta \le -\gamma$$

$$|f(\hat{r}_0, \omega_m)^T S_a B(\omega_m)\beta| \le \delta \quad m = 1, 2, \ldots, M$$

$$|f(\hat{r}_0, \omega_m)^T S_e B(\omega_m)\beta| \le \delta \quad m = 1, 2, \ldots, M.$$

Due to the difference in normalization by using (25) instead of (20), the parameter & may be set to a larger value in equation (32) compared to (31).

Non-Convex Optimization

In reference to foregoing, a general non-convex optimization program may be given by $$\min_{\beta,\tau,\phi^{(c)}\in\mathbb{R}^{+N}} \max\left\|D a(\omega_c),\ D^{(cr)} a(\omega_c)\right\|_2 \tag{33}$$

$$\text{subject to}$$

$$f(\hat{r}_0, \omega_c)^T a(\omega_c) = 1,$$

$$|f(\hat{r}_0, \omega_m)^T S_a B(\omega_m) a(\omega_c)| \le \delta \quad m = 1, 2, \ldots, M$$

$$|f(\hat{r}_0, \omega_m)^T S_e B(\omega_m) a(\omega_c)| \le \delta \quad m = 1, 2, \ldots, M$$

The implementation of the non-convex program follows (31) with the difference being that t is introduced as an optimization parameter rather than being specified by (8). While it is not stated explicitly in (33), the variable $a(\omega)$ are functions of τ according to (15). It is possible to modify (33) for Case B by setting $\phi^{(c)}=\omega_c=0$, and using constraint (25).

Executable instructions for performing these functions are, optionally, included in a non-transitory computer-readable storage medium or other computer program product configured for execution by one or more processors.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a control device, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of forming a first matrix and forming a second matrix may be interchanged based on a specific realization. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

The invention claimed is:

1. A method for excitation of an array antenna across a specified bandwidth, wherein the specified bandwidth comprises M sample points, M being a positive integer >1, the array antenna comprising N antenna elements, N being a positive integer ≥2, wherein each antenna element is arranged to be excited according to a corresponding sought excitation coefficient, the method comprising:

forming a first matrix B(ω) defining an allowed frequency variation for the excitation coefficient for each antenna element;

forming a second matrix describing far field data for each antenna element at each sample point;

optimizing N excitation coefficients based on the formed first matrix and the formed second matrix, wherein optimizing comprises defining a convex optimization problem based on the first matrix and the second matrix and solving the defined convex optimization problem with respect to the excitation coefficient for each antenna element; and controlling an excitation of the N antenna elements based on the optimized excitation coefficients.

2. The method according to claim 1, wherein the convex optimization problem comprises a cost function related to side-lobe levels at the sample points.

3. The method according to claim 1, wherein each antenna element is connected to a Transmit and Receive Module, TRM, and wherein the step of forming the first matrix comprises:

forming the first matrix B(ω) defining the allowed frequency variation for each excitation coefficient based on a predefined function.

4. The method according to claim 3, wherein the TRM comprises a variable gain amplifier or a tuneable attenuator in combination with a phase shifter and/or a true time delay unit.

5. The method according to claim 3, wherein the first matrix B(ω) is a diagonal N×N matrix defined by, $$B_{nn}(\omega) = e^{-j(\omega-\omega_c)\tau_n}$$

and wherein, ω is an angular frequency, $\omega_c$ is a reference frequency, $\tau_n$ is a time delay for antenna element n.

6. The method according to claim 1, wherein the second matrix describes an Embedded Element Pattern (EEP) for each antenna element at each sample point.

7. The method according to claim 1, wherein the step of controlling the excitation comprises forming beams with the N antenna elements based on the optimized excitation coefficients.

8. A computer-readable storage medium storing one or more programs configured to be executed by one or more processors of an array antenna control system, the one or more programs comprising instructions for performing the method according to claim 1.

9. An antenna array having an operating bandwidth, the antenna array comprising:

N antenna elements, N being a positive integer ≥2, each antenna element being connected to a Transmit and Receive Module, TRM;

control circuitry connected to each TRM, the control circuitry being configured to:

control each TRM so to apply an excitation coefficient for each antenna element, each excitation coefficient being optimized in accordance with the method according to claim 1.

10. A vehicle comprising an antenna array according to claim 9.

11. An aircraft comprising an antenna array according to claim 9.

* * * * *